US011644383B2

United States Patent
Shen et al.

(10) Patent No.: US 11,644,383 B2
(45) Date of Patent: May 9, 2023

(54) ADAPTIVE MANIFOLD PROBABILITY DISTRIBUTION-BASED BEARING FAULT DIAGNOSIS METHOD

(71) Applicant: SOOCHOW UNIVERSITY, Suzhou (CN)

(72) Inventors: Changqing Shen, Suzhou (CN); Yu Xia, Suzhou (CN); Lin Kong, Suzhou (CN); Liang Chen, Suzhou (CN); Piao Lei, Suzhou (CN); Yongjun Shen, Suzhou (CN); Dong Wang, Suzhou (CN); Hongbo Que, Suzhou (CN); Aiwen Zhang, Suzhou (CN); Minjie Chen, Suzhou (CN); Chuancang Ding, Suzhou (CN); Xingxing Jiang, Suzhou (CN); Jun Wang, Suzhou (CN); Juanjuan Shi, Suzhou (CN); Weiguo Huang, Suzhou (CN); Zhongkui Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 2 days.

(21) Appl. No.: 17/625,325

(22) PCT Filed: Nov. 26, 2020

(86) PCT No.: PCT/CN2020/131653
§ 371 (c)(1),
(2) Date: Jan. 6, 2022

(87) PCT Pub. No.: WO2022/095156
PCT Pub. Date: May 12, 2022

(65) Prior Publication Data
US 2022/0373430 A1    Nov. 24, 2022

(30) Foreign Application Priority Data

Nov. 5, 2020 (CN) .......................... 202011224083.4

(51) Int. Cl.
*G01M 13/045* (2019.01)

(52) U.S. Cl.
CPC ................... *G01M 13/045* (2013.01)

(58) Field of Classification Search
CPC .................................................. G01M 13/045
(Continued)

(56) References Cited

U.S. PATENT DOCUMENTS

2020/0285997 A1* 9/2020 Bhattacharyya ......... G06N 7/00

FOREIGN PATENT DOCUMENTS

| CN | 106408014 A | 2/2017 |
| CN | 107316057 A | 11/2017 |

(Continued)

OTHER PUBLICATIONS

Liu et al., "A New RBF Neural Network with GA-based Fuzzy C-Means Clustering Algorithm for SINS Fault Diagnosis" 2009 Chinese Control and Decision Conference (CCDC 2009), pp. 208-211 (Dec. 31, 2009).

(Continued)

*Primary Examiner* — Aditya S Bhat
(74) *Attorney, Agent, or Firm* — SZDC Law P.C.

(57) ABSTRACT

The invention provides an adaptive manifold probability distribution-based bearing fault diagnosis method, including constructing transferable domains and transfer tasks; converting a data sample in each transfer task into frequency domain data via Fourier transform, inputting the frequency domain data into a GFK algorithm model, and calculating a manifold feature representation matrix related to a bearing fault in each transfer task by using the GFK algorithm model; calculating a cosine distance between centers of a target domain and a source domain in each transfer task according to a manifold feature representation, and defining a target function of in-domain classifier learning; then solv- (Continued)

ing the target function, to obtain a probability distribution matrix of the target domain; and selecting a label corresponding to the largest probability value corresponding to each data sample in the target domain from the probability distribution matrix as a predicted label of the data sample in the target domain.

9 Claims, 7 Drawing Sheets

(58) Field of Classification Search
USPC .......................................................... 702/39
See application file for complete search history.

(56) References Cited

FOREIGN PATENT DOCUMENTS

| | | |
|---|---|---|
| CN | 108960270 A | 12/2018 |
| CN | 109948741 A | 6/2019 |
| CN | 110555273 A | 12/2019 |
| CN | 111829782 A | 10/2020 |
| CN | 111860677 A | 10/2020 |
| DE | 102017109647 A1 | 11/2018 |

OTHER PUBLICATIONS

Zhang et al., "Protection-type transfer learning clustering algorithm with cosine distance metric Computer Engineering and Applications" Computer Engineering and Applications, 2015, 51(23): 131-138 (Dec. 31, 2015).

* cited by examiner

FIG. 1 constructing a plurality of transferable domains and establishing one transfer task, wherein in each transfer task, one transferable domain is designated as a source domain, the other transferable domain is a target domain

↓ converting each data sample in the source domain and the target domain in each transfer task into frequency domain data via Fourier transform, inputting the frequency domain data into a GFK algorithm model, and calculating a manifold feature representation matrix related to a bearing fault in each transfer task by using the GFK algorithm model

↓ calculating a cosine distance between centers of a target domain and a source domain in each transfer task according to a manifold feature representation, and defining a target function of in-domain classifier learning

↓ solving the target function according to the solved cosine distance and a constraint that an element in a probability distribution matrix of the target domain needs to satisfy, to obtain a probability distribution matrix of the target domain

↓ selecting a label corresponding to the largest probability value corresponding to each data sample in the target domain from the probability distribution matrix as a predicted label of the data sample in the target domain

|  | $w_1^i$ | $w_2^i$ | $w_3^i$ | $w_4^i$ | $w_j^i$ | $w_n^i$ |
|---|---|---|---|---|---|---|
| C1 | 0.2 | 0.7 | 0.1 | 0.3 | $P_{1j}$ | ... |
| C2 | 0.4 | 0.1 | 0.2 | 0.1 | $P_{2j}$ | ... |
| C3 | 0.1 | 0.1 | 0.6 | 0.1 | $P_{3j}$ | ... |
| C4 | 0.3 | 0.1 | 0.1 | 0.5 | $P_{4j}$ | ... |
| $\sum_c^c P_q$ | 1 | 1 | 1 | 1 | 1 | 1 |
| $w_j^i$ | C2 | C1 | C3 | C4 | ... | ... |

ADAPTIVE MANIFOLD PROBABILITY DISTRIBUTION-BASED BEARING FAULT DIAGNOSIS METHOD

This application is the National Stage Application of PCT/CN2020/131653, filed on Nov. 26, 2020, which claims priority to Chinese Patent Application No. 202011224083.4, filed on Nov. 5, 2020, which is incorporated by reference for all purposes as if fully set forth herein.

FIELD OF THE INVENTION

The present invention relates to the field of fault diagnosis technologies for mechanical equipment, and more particularly to an adaptive manifold probability distribution-based bearing fault diagnosis method.

DESCRIPTION OF THE RELATED ART

A rolling bearing is a basic component of rotating machinery, and plays an important role in supporting a rotating body of machinery, reducing a coefficient of friction, and ensuring the accuracy of rotation. To prevent an economic or personal loss due to a bearing failure, the condition of a bearing needs to be monitored. In existing bearing fault diagnosis, mostly, vibration signals acquired by sensors are analyzed. For example, fault feature frequency extraction, short-time Fourier transform, empirical mode decomposition, and sparse representation are performed based on vibration signals. In addition, a large number of machine learning algorithms such as a support vector machine (SVM), an artificial neural network (ANN), a convolutional neural network (CNN), and an autoencoder (AE) are also used to automatically learn features of bearing faults. However, most existing fault diagnosis methods are based on the common assumption that "training data and test data must satisfy the same distribution". However, in an actual working condition, the distributions of bearing vibration signals acquired by sensors are usually inconsistent, resulting in poor fault diagnosis. For example, existing fault diagnosis methods usually use cross-validation to select models and adjust parameters. However, samples in a target domain usually lack labels, making such methods infeasible in transfer learning. In addition, transfer learning models used in deep learning algorithms are usually parametric methods, and it is very complex and time-consuming to tune hyperparameters in a matrix.

Therefore, the existing bearing fault diagnosis methods have a high diagnosis error rate, and a transfer learning model is complex, making it inconvenient to adjust model parameters. As a result, the methods have low diagnosis efficiency and fail to meet use requirements.

SUMMARY OF THE INVENTION

A technical problem to be resolved by the present invention is to provide an adaptive manifold probability distribution-based bearing fault diagnosis method, so that the diagnosis accuracy and the diagnosis efficiency of bearing fault diagnosis can be improved.

To resolve the foregoing technical problems, the technical solutions provided in the present invention are as follows:

An adaptive manifold probability distribution-based bearing fault diagnosis method, including the following steps:

1) constructing a plurality of transferable domains, where each transferable domain includes data samples of a plurality of fault types of a bearing, and different transferable domains conform to different conditional distributions and marginal distributions; and defining any two transferable domains to form one transfer task, where in each transfer task, one transferable domain is designated as a source domain, the other transferable domain is a target domain, and each data sample in the source domain is marked with a fault type label;

2) converting each data sample in the source domain and the target domain in each transfer task into frequency domain data via Fourier transform, inputting the frequency domain data into a Geodesic Flow Kernel (GFK) algorithm model, and calculating a manifold feature representation matrix related to a bearing fault in each transfer task by using the GFK algorithm model;

3) calculating a cosine distance between centers of a target domain and a source domain in each transfer task according to a manifold feature representation, and defining a target function of in-domain classifier learning;

4) solving the target function according to the solved cosine distance and a constraint that an element in a probability distribution matrix of the target domain needs to satisfy, to obtain the probability distribution matrix of the target domain; and 5) selecting a fault type label corresponding to the largest probability value corresponding to each data sample in the target domain from the probability distribution matrix as a predicted fault type label of the data sample in the target domain, to complete bearing fault diagnosis.

In an embodiment, a method for constructing a transferable domain is: acquiring vibration signals of the bearing under each fault type in different working conditions as the data samples, and then grouping data samples in one same working condition into one transferable domain.

In an embodiment, a method for calculating a manifold feature representation matrix related to a bearing fault in each transfer task by using the GFK algorithm model in step 2) includes the following steps:

A1) defining a source domain $\mathcal{D}_s = \{X_s, Y_s\}$ and a target domain $\mathcal{D}_t = \{X_t\}$, where $X_s = \{x_i^s\}_{i=1}^m$ denotes a sample set of the source domain $\mathcal{D}_s$, $x_i^s$ denotes an $i^{th}$ data sample in the source domain $\mathcal{D}_s$, $Y_s = \{y_i^s\}_{i=1}^m$ denotes a fault type label set in the source domain $\mathcal{D}_s$, $y_i^s$ denotes an $i^{th}$ fault type label in the source domain $\mathcal{D}_s$, $X_t = \{x_j^t\}_{j=1}^n$ denotes a sample set of the target domain $\mathcal{D}_t$, $x_j^t$ denotes a $j^{th}$ data sample in the target domain $\mathcal{D}_t$, m denotes a total quantity of data samples in the source domain $\mathcal{D}_s$, and n denotes a total quantity of data samples in the target domain $\mathcal{D}_t$;

obtaining a subspace data set $P_S$ of the source domain $\mathcal{D}_s$ and a subspace data set $P_t$ of the target domain $\mathcal{D}_t$ by using a principal component analysis (PCA) method, combining $P_S$ and $P_t$ into one combined matrix $P_{s+t}$, and then calculating a sine angle $\alpha_d$ between $P_S$ and $P_{s+t}$ and a sine angle $\beta_d$ between $P_t$ and $P_{s+t}$, so that a consistency measurement function C(d) of $P_S$ and $P_t$ is:

$$C(d) = 0.5[\sin \alpha_d + \sin \beta_d];$$

A2) calculating an optimal subspace dimensionality d* by using a greedy algorithm:

$$d^* = \min\{d | C(d) = 1\};$$

A3) selecting first d* dimensions of feature vector matrices in $P_S$ and $P_t$ according to the optimal subspace dimensionality d* as preprocessed data after dimensionality reduction;

A4) calculating a manifold feature conversion core matrix G according to the preprocessed data after dimensionality reduction, and obtaining a manifold feature representation matrix W according to the manifold feature conversion core matrix G:

$$W=\sqrt{G}X,$$

where $X=[X_s,X_t]$; and

A5) obtaining a manifold feature representation matrix $W_s$, of the source domain $\mathcal{D}_s$ and a manifold feature representation matrix $W_t$ of the target domain $\mathcal{D}_t$ according to the manifold feature representation matrix W:

$$\begin{cases} W_s = \{w_i^s\}_{i=1}^m = W_{1:m} & w_i^s \in W_s, i \in \{1, 2, \ldots, m\} \\ W_t = \{w_j^t\}_{j=1}^n = W_{m+1:m+n} & w_j^t \in W_t, j \in \{1, 2, \ldots, n\} \end{cases},$$

where $w_i^s$ denotes an $i^{th}$ element in $W_s$, and $w_j^t$ denotes a $j^{th}$ element in $W_t$.

In an embodiment, the target function of the in-domain classifier learning in step 3) is defined as $\mathcal{L}$, so that:

$$\mathcal{L} = \Sigma_{j=1}^n \Sigma_{c=1}^C P_{cj} D_{cj},$$

where C denotes a total quantity of fault type labels, $P_{cj}$ is an element in the probability distribution matrix $P \in \mathbb{R}^{c \times n}$, and denotes a probability that $w_j^t$ in $W_t$ is a $c^{th}$ fault type label, and $D_{cj}$ is a cosine distance between centers of the target domain $\mathcal{D}_t$ and the source domain $\mathcal{D}_s$, and also denotes a distance between $w_j^t$ and a data set center $e_c$ corresponding to the $c^{th}$ fault type label.

In an embodiment, the cosine distance in step 3) is $D_{cj}$, and $D_{cj}$ is calculated by using the following formula:

$$D_{cj} = \frac{w_j^t e_c}{|w_j^t||e_c|},$$

where $e_c$ denotes the data set center corresponding to the $c^{th}$ fault type label in the source domain $\mathcal{D}_s$.

In an embodiment, $$e_c = \frac{1}{m^{(c)}} \Sigma_{i=1}^m w_i^s I(y_i^s = c),$$

where $m^{(c)}$ denotes a quantity of data samples corresponding to the $c^{th}$ fault type label in the source domain $\mathcal{D}_s$, $w_i^s$ is an $i^{th}$ element in $W_s$, and denotes a manifold feature representation of the $i^{th}$ data sample in the source domain $\mathcal{D}_s$, and $I(y_i^s=c)$ is an indicator function, $$I(y_i^s = c) = \begin{cases} 1, & \text{True} \\ 0, & \text{False} \end{cases}.$$

In an embodiment, the constraint that the element $P_{cj}$ in the probability distribution matrix P of the target domain needs to satisfy in step 4) is:

$$s.t. \begin{cases} \Sigma_{k=1}^C P_{cj} = 1, \forall j \in \{1, 2, \ldots, n\} \\ 0 \leq P_{cj} \leq 1 \\ \Sigma_{j=1}^n P_{cj} \geq 1, \forall c \in \{1, 2, \ldots, C\} \end{cases}.$$

In an embodiment, the target function is solved in the step 4) by using a linear programming solving method.

In an embodiment, a calculation formula for selecting a fault type label corresponding to the largest probability value corresponding to each data sample in the target domain from the probability distribution matrix as a predicted fault type label of the data sample in the target domain in step 5) is:

$$\hat{y}_j^t(x) = \arg\max_l \frac{P_{cj}}{\Sigma_{k=1}^C P_{cj}}, l \in \{1, 2, \ldots, C\},$$

where $\hat{y}_j^t(x)$ denotes a predicted fault type label of the $j^{th}$ data sample in the target domain $\mathcal{D}_t$.

The present invention has the following beneficial effects: The adaptive manifold probability distribution-based bearing fault diagnosis method of the present invention effectively improves the diagnosis accuracy and the diagnosis efficiency of bearing fault diagnosis, so that use requirements can be effectively satisfied.

In the drawings: 1, drive motor, 2, plum coupling, 3, normal bearing, 4, test bearing, 5, bearing seat, 6, cushioning device, 7, dynamometer, and 8, load adjustment device.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

This embodiment discloses an adaptive manifold probability distribution-based bearing fault diagnosis method. The method is described below with reference to actual experimental data.

Figure 1:
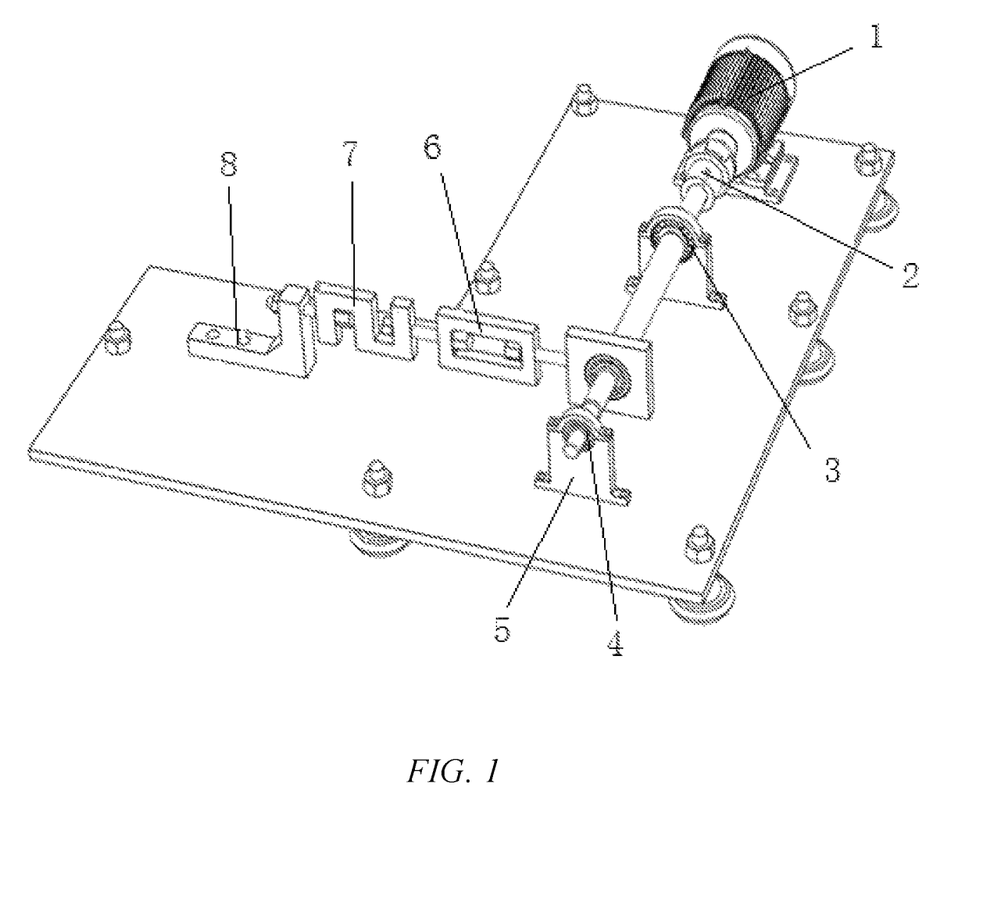
FIG. 1 is a schematic structural diagram of a bearing fault simulation test rig according to an embodiment of the present invention.

First, the experimental data (bearing data) in this embodiment is acquired by using a bearing fault simulation test rig shown in FIG. 1. The test rig includes a drive motor 1, a plum coupling 2, a normal bearing 3, a test bearing 4, a bearing seat 5, a cushioning device 6, a dynamometer 7, a load adjustment device 8, and an acceleration sensor. The load adjustment device 8 is used for adjusting a load, to simulate operating states of the bearing in different load conditions. The model of the used drive motor 1 is ABBQABP-90S-4A. The model of the used test bearing 4 is 6205-2RSSKF. The rotational speed of the drive motor 1 is set to 961 rpm. A sampling frequency is 10 kHz. In an experimental process, the acceleration sensor is placed on the bearing seat 5 at which the test bearing 4 is located, is located at the 12 o'clock direction from the test bearing, and vibration signals are acquired by using a data acquisition system NIPX1e-1082.

In addition, a cut is separately machined in an inner ring, a ball, and an outer ring of the test bearing 4 through wire cutting to simulate a bearing fault. The width of the cut denotes a fault size. The fault size includes 0.3 mm and 0.4 mm. Bearing fault types of the test bearing 4 are first classified as normal (NO), an inner-ring fault (IF), a ball fault (BF), and an outer-ring fault (OF). Each of the inner-ring fault (IF), the ball fault (BF), and the outer ring fault (OF) corresponds to the foregoing two fault sizes. In addition, four compound faulty bearings are machined with a width of 0.2 millimeters, that is, an inner ring/outer-ring fault (IOF), an inner ring/ball fault (IBF), an outer ring/ball fault (OBF), and an inner ring/outer ring/ball fault (IOBF), to implement more realistic simulation of actual fault conditions of the test bearing. The inner ring/outer-ring fault (IOF) denotes that fault occurs in both the inner ring and the outer ring. The inner ring/ball fault (IBF) denotes that fault occurs in both the inner ring and the ball. The outer ring/ball fault (OBF) denotes that fault occurs in both the outer ring and the ball. The inner ring/outer ring/ball fault (IOBF) denotes that fault occurs in all of the inner ring, the outer ring, and the ball. Therefore, there are a total of 1+2*3+4=11 fault types in this embodiment. That is, the test bearing has a total of 11 fault types. Each fault type corresponds to one fault type label.

Figure 2:
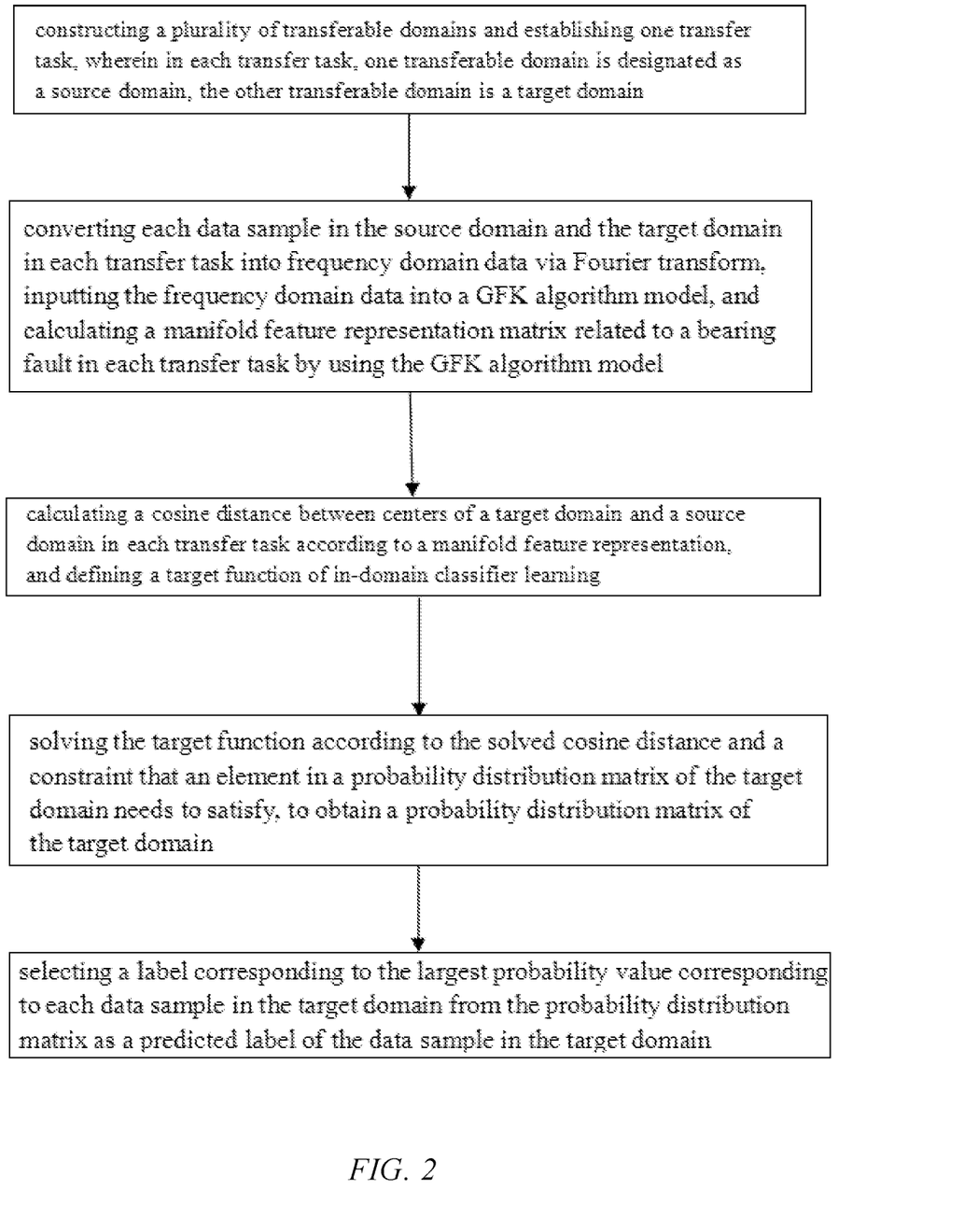
FIG. 2 is a flowchart of an adaptive manifold probability distribution-based bearing fault diagnosis method of the present invention.

Referring to FIG. 2, the adaptive manifold probability distribution-based bearing fault diagnosis method in this embodiment includes the following steps.

1) A plurality of transferable domains are constructed. Each transferable domain includes data samples of 11 fault types of a bearing. Different transferable domains conform to different conditional distributions and marginal distributions. Any two transferable domains are defined to form one transfer task. In each transfer task, one transferable domain is designated as a source domain $\mathcal{D}_s = \{X_s, Y_s\}$, the other transferable domain is a target domain $\mathcal{D}_t = \{X_t\}$, and each data sample in the source domain $\mathcal{D}_s$ is marked with a fault type label. No data sample in the target domain $\mathcal{D}_t$ is marked with a fault type label.

$X_s = \{X_i^s\}_{i=1}^m$ denotes a sample set of the source domain $\mathcal{D}_s$, $x_i^s$ denotes an $i^{th}$ data sample in the source domain $\mathcal{D}_s$, $Y_s = \{y_i^s\}_{i=1}^m$ denotes a fault type label set in the source domain $\mathcal{D}_s$, $y_i^s$ denotes an $i^{th}$ fault type label in the source domain $\mathcal{D}_s$, $X_t = \{X_j^t\}_{j=1}^n$ denotes a sample set of the target domain $\mathcal{D}_t$, $x_j^t$ denotes a $j^{th}$ data sample in the target domain $\mathcal{D}_t$, m denotes a total quantity of data samples in the source domain $\mathcal{D}_s$, and n denotes a total quantity of data samples in the target domain $\mathcal{D}_t$. $X_s \in \mathbb{R}^{m \times r}$, $Y_s \in \mathbb{R}^{m \times 1}$, $X_t \in \mathbb{R}^{n \times r}$, and r denotes a quantity of sample features. Basic assumption: A feature space is $\chi_s = \chi_t$, a label space is $\mathcal{Y}_s = \mathcal{Y}_t$, a conditional distribution is $Q(y^s(x)|x^s) \neq Q(y^t(x)|x^t)$, and an marginal distribution is $P(x^s) \neq P(x^t)$.

A method for constructing a transferable domain is: acquiring vibration signals of the bearing under each fault type in different working conditions as the data samples, and then grouping data samples in one same working condition into one transferable domain. Each transferable domain corresponds to one working condition.

Different working conditions refer to different load working conditions.

For example, four transferable domains may be constructed, and are separately marked as L0, L1, L2, and L3. L0 denotes a working condition that a radial load applied in the experiment is 0 kN. L1 denotes a working condition that a radial load applied in the experiment is 1 kN. L2 denotes a working condition that a radial load applied in the experiment is 2 kN. L3 denotes a working condition that a radial load applied in the experiment is 3 kN. Vibration time domain signal data of the test bearing of each fault type in the foregoing four load states is first acquired as data samples by using the acceleration sensor. 200 data samples are acquired in each fault type. Data samples in one same working condition are then grouped into one transferable domain. Each of the transferable domains L0, L1, L2, and L3 includes 11 fault types. Each fault type includes 200 data samples. That is, a total quantity of data samples in each transferable domain is 11*200=2200. In this case, in $X_s = \{x_i^s\}_{i=1}^m$ and $X_t = \{x_j^t\}_{j=1}^n$, m=n=2200. Refer to Table 1 for the composition of data samples in each transferable domain.

TABLE 1

Composition of 11 bearing fault types in each transferable domain

| Fault size/millimeter | Fault type | Label | Sample quantity | Symbol |
|---|---|---|---|---|
| — | Normal | 1 | 200 | NO |
| 0.2 | Inner ring/outer ring fault | 2 | 200 | IOF0.2 |
| 0.2 | Inner ring/ball fault | 3 | 200 | IBF0.2 |
| 0.2 | Outer ring/ball fault | 4 | 200 | OBF0.2 |
| 0.2 | Inner ring/outer ring/ball fault | 5 | 200 | IOBF0.2 |
| 0.3 | Inner ring fault | 6 | 200 | IF0.3 |
| 0.3 | Ball fault | 7 | 200 | BF0.3 |
| 0.3 | Outer ring fault | 8 | 200 | OF0.3 |
| 0.4 | Inner ring fault | 9 | 200 | IF0.4 |
| 0.4 | Ball fault | 10 | 200 | BF0.4 |
| 0.4 | Outer ring fault | 11 | 200 | OF0.4 |

One transfer task is formed between any two of the four transferable domains L0, L1, L2, and L3. A total of 12 transfer tasks may be established, that is: L0→L1, L0→L2, L0→L3; L1→L0, L1→L2, L1→L3; L2→L0, L2→L1, L2→L3; L3→L0, L3→L1, and L3→L2. In each transfer task, on the left side of an arrow is a source domain $\mathcal{D}_s$ marked with a fault type label, and on the right side is a target domain $\mathcal{D}_t$ that is not marked with a fault type label, which is a diagnosis object of a fault type to be recognized. Refer to Table 2 for specific settings of the transfer tasks.

TABLE 2

Settings of 12 transfer tasks

| Transfer task | Source domain | Target domain | Fault size (mm) | Single-domain sample quantity | Health status |
|---|---|---|---|---|---|
| 1 | L1 | L0 | 0.2/0.3/0.4 | 2200 | NO/IF/OF/BF/IOF/IBF/OBF/IOBF |
| 2 | L2 | L0 | 0.2/0.3/0.4 | 2200 | NO/IF/OF/BF/IOF/IBF/OBF/IOBF |
| 3 | L3 | L0 | 0.2/0.3/0.4 | 2200 | NO/IF/OF/BF/IOF/IBF/OBF/IOBF |
| 4 | L0 | L1 | 0.2/0.3/0.4 | 2200 | NO/IF/OF/BF/IOF/IBF/OBF/IOBF |
| 5 | L2 | L1 | 0.2/0.3/0.4 | 2200 | NO/IF/OF/BF/IOF/IBF/OBF/IOBF |
| 6 | L3 | L1 | 0.2/0.3/0.4 | 2200 | NO/IF/OF/BF/IOF/IBF/OBF/IOBF |
| 7 | L0 | L2 | 0.2/0.3/0.4 | 2200 | NO/IF/OF/BF/IOF/IBF/OBF/IOBF |
| 8 | L1 | L2 | 0.2/0.3/0.4 | 2200 | NO/IF/OF/BF/IOF/ |

TABLE 2-continued

Settings of 12 transfer tasks

| Transfer task | Source domain | Target domain | Fault size (mm) | Single-domain sample quantity | Health status |
|---|---|---|---|---|---|
| 9 | L3 | L2 | 0.2/0.3/0.4 | 2200 | NO/IF/OF/BF/IOF/IBF/OBF/IOBF |
| 10 | L0 | L3 | 0.2/0.3/0.4 | 2200 | NO/IF/OF/BF/IOF/IBF/OBF/IOBF |
| 11 | L1 | L3 | 0.2/0.3/0.4 | 2200 | NO/IF/OF/BF/IOF/IBF/OBF/IOBF |
| 12 | L2 | L3 | 0.2/0.3/0.4 | 2200 | NO/IF/OF/BF/IOF/IBF/OBF/IOBF |

2) Each data sample in the source domain and the target domain in each transfer task is converted into frequency domain data via Fast Fourier transform (FFT), the frequency domain data is inputted into a GFK algorithm model, and a manifold feature representation matrix related to a bearing fault in each transfer task is calculated by using the GFK algorithm model, to implement cross-domain data distribution alignment in variable working conditions.

Further, when original data samples of the bearing are converted into frequency domain signals via FFT, one-sided spectrum information of the frequency domain is kept.

3) A cosine distance between centers of a target domain and a source domain in each transfer task according to a manifold feature representation is calculated, and a target function of in-domain classifier learning is defined.

4) The target function is solved according to the solved cosine distance and a constraint that an element in a probability distribution matrix of the target domain needs to satisfy, to obtain the probability distribution matrix of the target domain.

5) A fault type label corresponding to the largest probability value corresponding to each data sample in the target domain from the probability distribution matrix is selected as a predicted fault type label of the data sample in the target domain, to complete bearing fault diagnosis.

Figure 5:
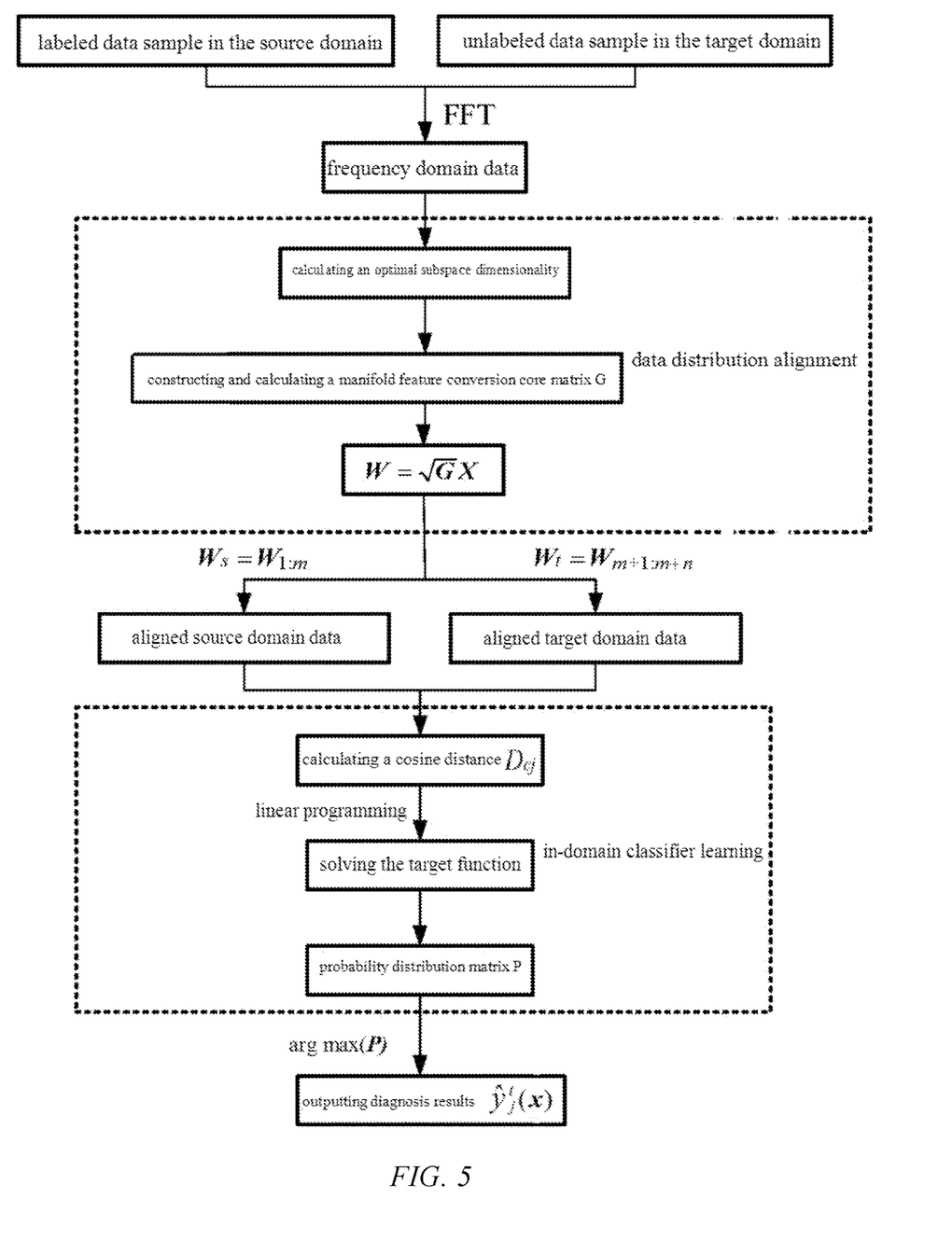
FIG. 5 is a principle block diagram of a bearing fault diagnosis method according to the present invention.

In an embodiment, referring to FIG. 5, a method for calculating a manifold feature representation matrix related to a bearing fault in each transfer task by using the GFK algorithm model in the foregoing step 2) includes the following steps.

A1) A source domain $\mathcal{D}_s=\{X_s, Y_s\}$ and a target domain $\mathcal{D}_t=\{X_t\}$ are defined. A subspace data set $P_S$ of the source domain $\mathcal{D}_s$ and a subspace data set $P_t$ of the target domain $\mathcal{D}_t$ are obtained by using a PCA method. $P_S$ and $P_t$ are combined into one combined matrix $P_{s+t}$. A sine angle $\alpha_d$ between $P_S$ and $P_{s+t}$ and a sine angle $\beta_d$ between $P_t$ and $P_{s+t}$ are then calculated, so that a consistency measurement function C(d) of $P_s$ and $P_t$ is:

$C(d)=0.5[\sin \alpha_d+\sin \beta_d]$.

Here, when the source domain is more similar to the target domain, the value of C(d) is larger, while it is ensured that a variance captured in one subspace can be transferred to another subspace, that is: $\alpha_d \neq \pi/2$, and $\beta_d \neq \pi/2$.

A2) An optimal subspace dimensionality d* is calculated by using a greedy algorithm:

$d^*=\min\{d|C(d)=1\}$.

A3) First d* dimensions of feature vector matrices in data sets $P_S$ and $P_t$ are selected according to the optimal subspace dimensionality d* as preprocessed data after dimensionality reduction.

An optimal subspace dimensionality is calculated by using a greedy algorithm. Eigenvectors more related to bearing faults are selected, and redundant unrelated features are eliminated, thereby improving the performance of bearing fault diagnosis and helping to increase the operation speed.

A4) A manifold feature conversion core matrix G is calculated according to the preprocessed data after dimensionality reduction, and a manifold feature representation matrix W is obtained according to the manifold feature conversion core matrix G:

$W=\sqrt{G}X$, where $X=[X_s, X_t]$.

The manifold feature conversion core matrix G is $$G = \begin{bmatrix} P_S U_1 & R_S U_2 \end{bmatrix} \begin{bmatrix} \Lambda_1 & \Lambda_2 \\ \Lambda_2 & \Lambda_3 \end{bmatrix} \begin{bmatrix} U_1^T & P_S^T \\ U_2^T & R_S^T \end{bmatrix}.$$

In the foregoing formula, $\Lambda_1$, $\Lambda_2$, and $\Lambda_3$ are all diagonal matrices. A diagonal element of $\Lambda_1$ is $$\lambda_{1i} = 1 + \frac{\sin(2\theta_i)}{2\theta_i}.$$

A diagonal element of $\Lambda_2$ is $$\lambda_{2i} = \frac{\cos(2\theta_i)-1}{2\theta_i}.$$

A diagonal element of $\Lambda_3$ is $$\lambda_{3i} = 1 - \frac{\sin(2\theta_i)}{2\theta_i}.$$

$U_1 \in \mathbb{R}^{d \times d}$ and $U_2 \in \mathbb{R}^{(r-d) \times d}$ denote a pair of orthogonal matrices, and may be calculated by using the following singular value decomposition: $P_S^T P_t = U_1 \Gamma V^T$, $R_S^T P_t = -U_2 \Sigma V^T$. $R_S \in \mathbb{R}^{r \times (r-d)}$ is an orthogonal complement of $P_S$. $\Gamma$ and $\Sigma$ are both diagonal matrices. Diagonal elements of $\Gamma$ and $\Sigma$ are respectively $\cos \theta_i$ and $\sin \theta_i$ (i=1, 2, . . . d*). $\theta_i$ ($0 \leq \theta_1 \leq \theta_2 \leq \ldots \theta_{d*} \leq \pi/2$) is an angle between subspaces $P_S$ and $P_t$.

Figure 3:
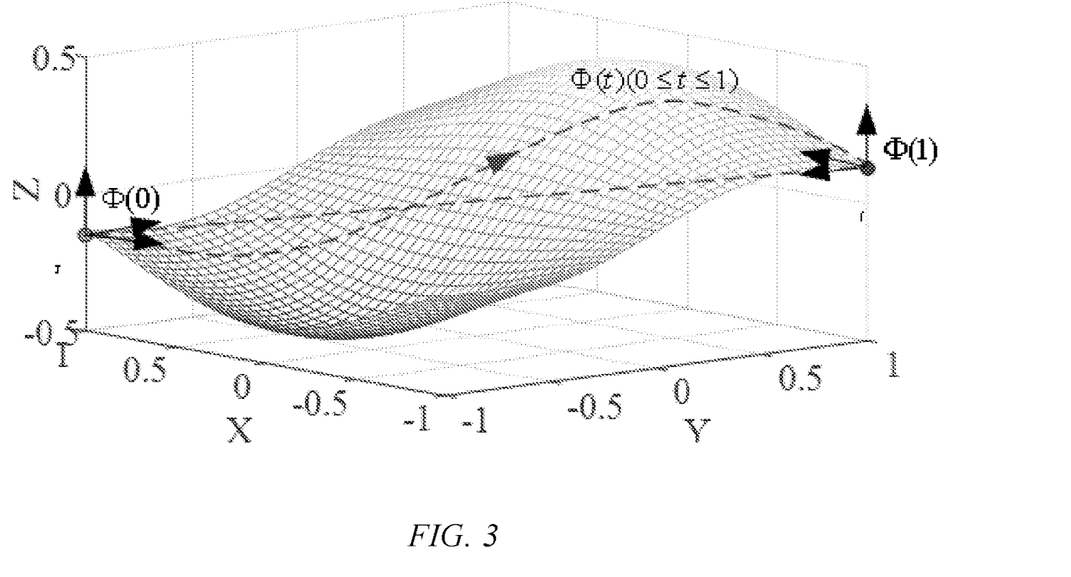
FIG. 3 is a principle diagram of a GFK algorithm.

It may be understood that a feature in a manifold space usually has adequate geometric properties, so that inter-domain data distribution differences can be reduced. Therefore, features in the original space are first transformed into a Grassmann manifold $\mathbb{G}$(d), and referring to FIG. 3, original d*-dimensional subspaces (eigenvectors) are seen as basic elements thereof, to promote classifier learning. $P_S$ and $P_t$ are seen as two points in $\mathbb{G}$(d). One geodesic flow $\Phi(t)(0 \leq t \leq 1)$ may be built between the two points. Converted features are represented as: $w=g(x)=\Phi(t)^T x$. Any two converted eigenvectors $w_i$ and $w_j$ are chosen. An inner product of the eigenvectors define one kernel function: $\langle w_i^s, w_j^t \rangle = \int_0^1 (\Phi(t)^T x_i^s)^T (\Phi(t)^T x_j^t) dt = x_i^{sT} G x_j^t$. $G \in \mathbb{R}^{r \times r}$ is a positive semi-definite matrix obtained through singular value decomposition. A converted manifold feature is represented as $W=\sqrt{G}X$.

A5) A manifold feature representation matrix $W_s$ of the source domain $\mathcal{D}_s$ and a manifold feature representation matrix $W_t$ of the target domain $\mathcal{D}_t$ are obtained according to the manifold feature representation matrix W:

$$\begin{cases} W_s = \{w_i^s\}_{i=1}^m = W_{1:m} & w_i^s \in W_s, i \in \{1, 2, \ldots, m\} \\ W_t = \{w_j^t\}_{j=1}^n = W_{m+1:m+n} & w_j^t \in W_t, j \in \{1, 2, \ldots, n\} \end{cases},$$

where $w_i^s$ denotes an $i^{th}$ element in $W_s$, and $w_j^t$ denotes a $j^{th}$ element in $W_t$.

It may be understood that the manifold feature representation matrix W is a combined matrix of the matrices $W_s$ and $W_t$. A set of the first to $m^{th}$ pieces of data in W forms $W_s$, and a set of the remaining $(m+1)^{th}$ to $(m+n)^{th}$ pieces of data forms $W_t$.

In an embodiment, the target function of the in-domain classifier learning in step 3) is defined as $\mathscr{L}$, the target function is $\mathscr{L}$:

$$\mathscr{L} = \Sigma_{j=1}^n \Sigma_{c=1}^C P_{cj} D_{cj},$$

where C denotes a total quantity of fault type labels, $P_{cj}$ is an element in the probability distribution matrix $P \in \mathbb{R}^{C \times n}$ of the target domain, and denotes a probability that $W_t$ in $w_j^t$ is a $c^{th}$ fault type label, and $D_{cj}$ is a cosine distance between centers of the target domain $\mathcal{D}_t$ and the source domain $\mathcal{D}_s$, and also denotes a distance between $w_j^t$ and a data set center $e_c$ corresponding to the $c^{th}$ fault type label. For example, referring to Table 1, in this case, C=11. A total quantity of data samples in the target domain is n=2200. Each fault type label corresponds to one fault type. If c=1, it represents the first fault type label, and a fault type corresponding to the label is normal. If c=6, it represents the sixth fault type label, and a fault type corresponding to the label is an inner-ring fault.

In an embodiment, the cosine distance in step 3) is $D_{cj}$, and $D_{cj}$ is calculated by using the following formula:

$$D_{cj} = \frac{w_j^t e_c}{|w_j^t||e_c|},$$

where $e_c$ denotes the data set center corresponding to the $c^{th}$ fault type label in the source domain $\mathcal{D}_s$, and $w_j^t$ denotes a $j^{th}$ element in $W_t$.

Further, $e_c$ is calculated by using the following formula:

$$e_c = \frac{1}{m^{(c)}} \Sigma_{i=1}^m w_i^s I(y_i^s = c).$$

$m^{(c)}$ denotes a quantity of data samples corresponding to the $c^{th}$ fault type label in the source domain $\mathcal{D}_s$. $w_i^s$ is an $i^{th}$ element in $W_s$, and denotes a manifold feature representation of the $i^{th}$ data sample in the source domain $\mathcal{D}_s$.

$I(y_i^s = c)$ is an indicator function, $$I(y_i^s = c) = \begin{cases} 1, & \text{True} \\ 0, & \text{False} \end{cases}.$$

That is, if the $i^{th}$ label $y_i^s$ in the source domain $\mathcal{D}_s$ is the $c^{th}$ fault type label, the value of I is equal to 1, or otherwise the value of I is equal to 0.

In an embodiment, the constraint that the element $P_{cj}$ in the probability distribution matrix P of the target domain needs to satisfy in step 4) is:

$$\text{s.t.} \begin{cases} \sum_{c=1}^C P_{cj} = 1, \forall j \in \{1, 2, \ldots, n\} \\ 0 \leq P_{cj} \leq 1 \\ \sum_{j=1}^n P_{cj} \geq 1, \forall c \in \{1, 2, \ldots, C\} \end{cases}.$$

For a probability distribution of $w_j^t$, a sum of all probability values that $w_j^t$ belong to different classes is 1, and it is therefore obtained that the constraint is: $\Sigma_{c=1}^C P_{cj} = 1$, $\forall j \in \{1, 2, \ldots, n\}$.

In addition, unmarked data samples in the target domain do not necessarily completely conform to a 0 to 1 distribution. However, in fact, learned classifiers can readily differentiate between partial fault data that are collected in different working conditions. Assuming that samples having the same fault type label usually exhibit obvious clustering, in an optimal case, all samples to be recognized in the target domain tend to conform to a 0-1 distribution. In this way, the constraint $\Sigma_{j=1}^n P_{cj} \geq 1$, $\forall c \in \{1, 2, \ldots, C\}$ is obtained. The constraint replaces a conventional constraint $P_{cj} = \max(P_{lj})$, $l \in \{1, 2, \ldots, C\}$, $\forall c \in \{1, 2, \ldots, C\}, \exists j$. Compared with the conventional constraint, the foregoing constraint is easier to program and implement.

In an embodiment, the target function is solved in the step 4) by using a linear programming solving method. That is, according to the target function and three constraints, an optimization objective of the target function of in-domain classifier learning may be denoted as:

$$\min \mathscr{L} = \sum_{j=1}^n \sum_{c=1}^C P_{cj} D_{cj}$$

$$\text{s.t.} \begin{cases} \sum_{c=1}^C P_{cj} = 1, \forall j \in \{1, 2, \ldots, n\} \\ 0 \leq P_{cj} \leq 1 \\ \sum_{j=1}^n P_{cj} \geq 1, \forall c \in \{1, 2, \ldots, C\} \end{cases}$$

Figure 4:
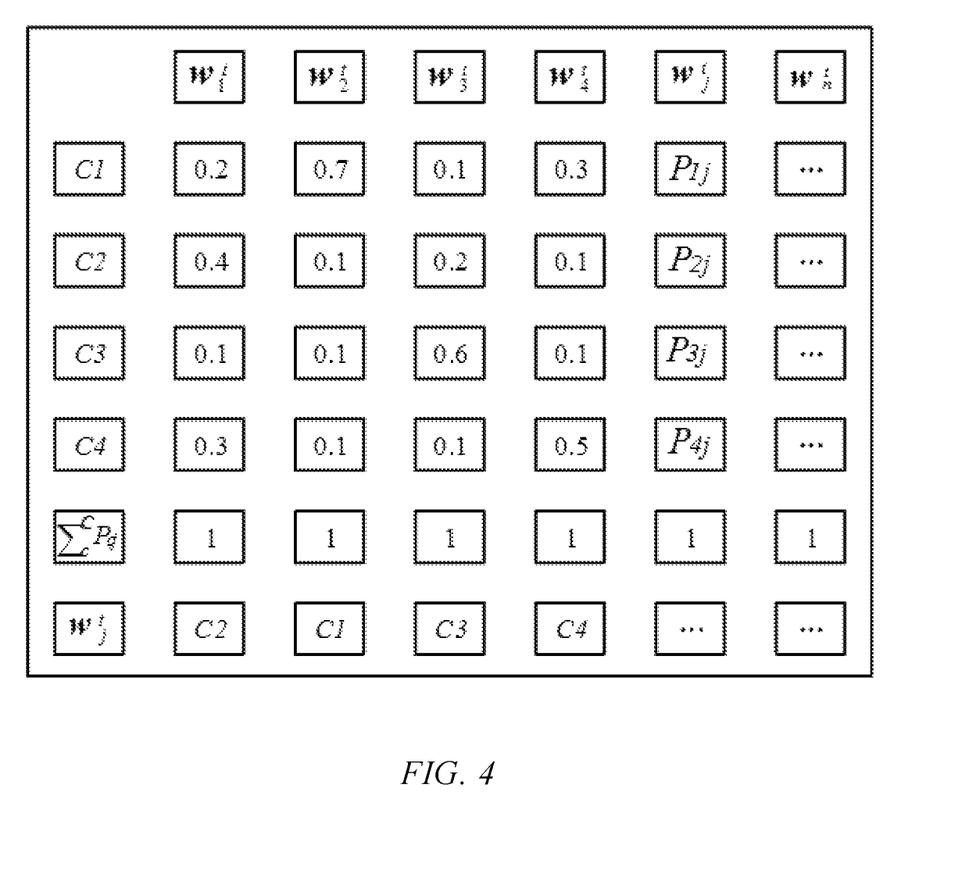
FIG. 4 is an exemplary diagram of a probability distribution matrix.

An optimization problem of the target function is actually converted into a linear programming problem. The probability distribution matrix $P \in \mathbb{R}^{C \times n}$ of the data sample in the target domain may be obtained by solving the problem. FIG. 4 is an exemplary diagram of a probability distribution matrix.

In an embodiment, a calculation formula for selecting a fault type label corresponding to the largest probability value corresponding to each data sample in the target domain from the probability distribution matrix P as a predicted fault type label of the data sample in the target domain in step 5) is:

$$\hat{y}_j^t(x) = \arg\max_l \frac{P_{cj}}{\sum_{c=1}^C P_{cj}}, l \in \{1, 2, \ldots, C\}.$$

$\hat{y}_j^t(x)$ denotes a predicted fault type label of the $j^{th}$ data sample in the target domain $\mathcal{D}_t$.

It may be understood that no data sample in the target domain is marked with a fault type label. By means of the probability distribution matrix P, the largest probability that each data sample in the target domain belong to a fault type label may be obtained, and a fault type label corresponding to the largest probability value is used as a predicted fault type label of an unmarked data sample.

The bearing fault diagnosis method in the foregoing embodiment is compared with five conventional diagnosis algorithms. The five conventional diagnosis algorithms are: a K-Nearest Neighbor (KNN) algorithm; PCA; Subspace Alignment (SA); Transfer Component Analysis (TCA); and GFK. Refer to Table 3 for comparison results of fault diagnosis accuracy of the diagnosis methods:

TABLE 3

Fault diagnosis accuracy of experimental data

| Transfer task | KNN | PCA | SA | TCA | GFK | This embodiment |
|---|---|---|---|---|---|---|
| L0→L1 | 99.45 | 97.82 | 99.27 | 98.64 | 98.91 | 99.50 |
| L0→L2 | 94.23 | 90.41 | 94.32 | 97.14 | 94.05 | 99.09 |
| L0→L3 | 86.41 | 90.41 | 87.09 | 88.95 | 97.41 | 97.23 |
| L1→L0 | 95.14 | 95.73 | 99.95 | 96.36 | 99.41 | 99.82 |
| L1→L2 | 95.23 | 95.73 | 95.45 | 99.59 | 97.95 | 99.23 |
| L1→L3 | 87.55 | 93.36 | 89.45 | 94.50 | 90.36 | 97.09 |
| L2→L0 | 88.91 | 90.41 | 98.27 | 89.36 | 96.86 | 99.68 |
| L2→L1 | 99.64 | 97.55 | 99.95 | 99.45 | 96.68 | 99.41 |
| L2→L3 | 92.41 | 97.00 | 90.82 | 98.00 | 89.55 | 97.36 |
| L3→L0 | 74.64 | 87.73 | 88.82 | 89.41 | 88.91 | 99.27 |
| L3→L1 | 90.73 | 99.05 | 91.82 | 89.27 | 98.50 | 99.27 |
| L3→L2 | 92.36 | 99.68 | 92.64 | 98.73 | 98.95 | 99.23 |
| Average accuracy | 91.39 | 94.57 | 93.99 | 94.95 | 95.62 | 98.85 |
| Average accuracy rank | 6 | 4 | 5 | 3 | 2 | 1 |

As can be seen from the diagnosis results in Table 3, the diagnosis method in this embodiment achieves the highest accuracy in 6 out of the 12 transfer tasks, achieves the highest average diagnosis accuracy (98.85%), obtains a diagnosis accuracy of not less than 97.00% for all the transfer tasks, and exhibits a high accuracy and robustness of diagnosis results in a plurality of working conditions.

Figure 6:
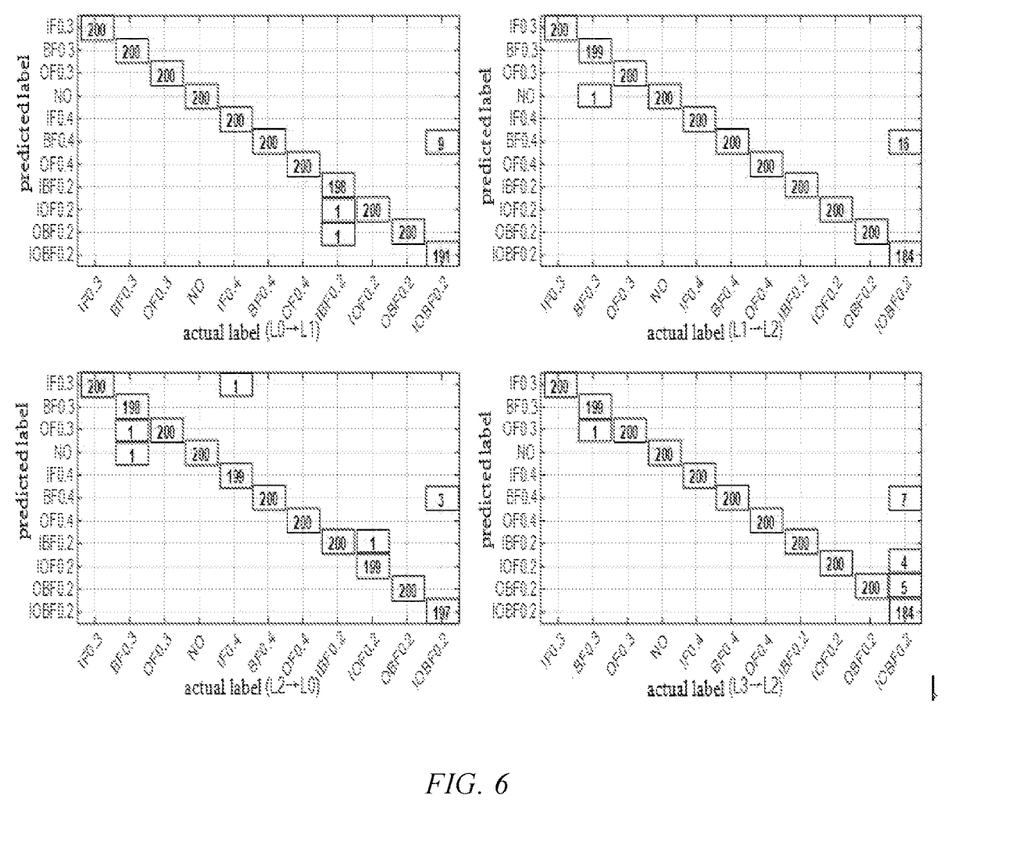
FIG. 6 is a diagram of fault diagnosis confusion matrices of four transfer tasks.

FIG. 6 is a diagram of fault diagnosis confusion matrices of four transfer tasks in this embodiment. FIG. 6 shows that when the diagnosis method in this embodiment is used to perform different transfer diagnosis tasks, the method has an excellent fault recognition capability for a bearing with a single fault. Diagnosis errors generally all occur during fault diagnosis of a bearing with a compound fault. This is caused by the complexity of vibration signals of a bearing with a compound fault.

Figure 7:
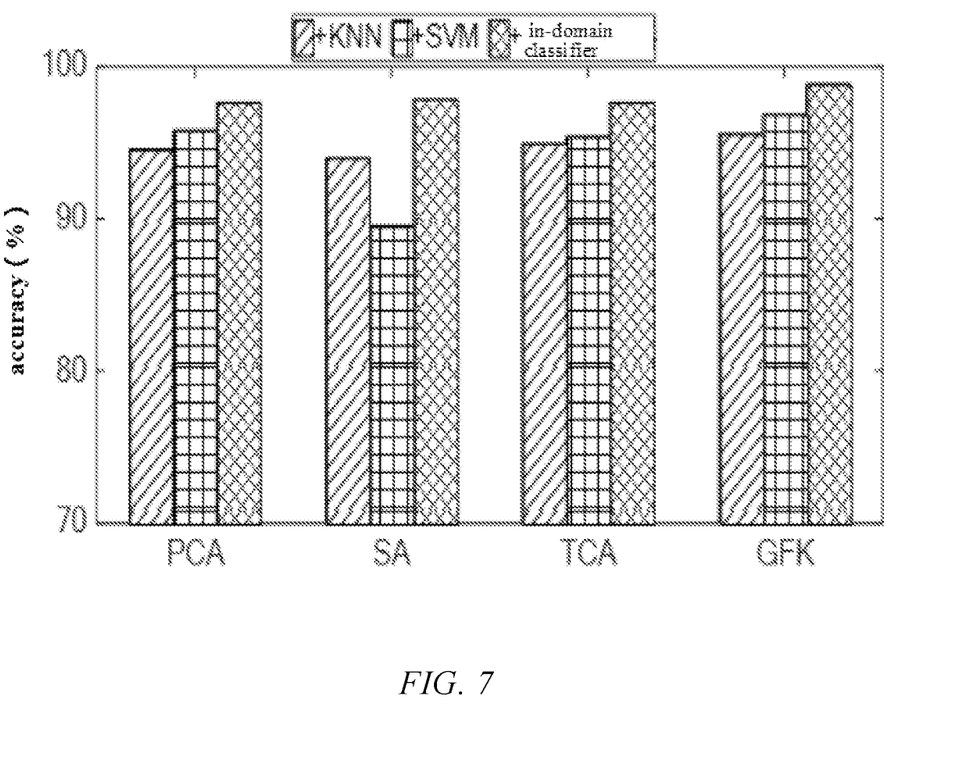
FIG. 7 is an effect diagram of extensibility of a bearing fault diagnosis method according to the present invention.

FIG. 7 is an effect diagram of extensibility of an adaptive manifold probability distribution-based bearing fault diagnosis method in this embodiment. FIG. 7 indicates that compared with KNN and SVM classifiers, an in-domain classifier provided in the present invention can effectively improve the fault diagnosis performance of four transfer learning methods, that is, has better extensibility.

The adaptive manifold probability distribution-based bearing fault diagnosis method in this embodiment has the following advantages:

(1) A manifold feature representation matrix related to a bearing fault is acquired by using a GFK algorithm. That is, a geodesic flow kernel is built in a Grassmann manifold space to acquire a manifold feature representation of data, and an optimal subspace dimensionality is automatically calculated, thereby effectively reducing distribution differences in inter-domain data.

(2) In-domain classifier learning is implemented by calculating a cosine distance and solving a target function and a probability distribution matrix. A parameter-free in-domain classifier is built based on a probability distribution of samples. The in-domain classifier is combined with a GFK manifold learning algorithm, so that the diagnosis accuracy and the diagnosis efficiency of bearing fault diagnosis in variable working conditions are improved. In addition, the in-domain classifier may also be combined with another existing data alignment and feature extraction algorithm, thereby implementing adequate extensibility.

(3) A process of constructing data distribution alignment and in-domain classifier learning is very simple. Complex model selection and hyperparameter tuning are not required. The characteristic can better satisfy actual requirements of fault diagnosis in different working conditions.

(4) Compared with a deep learning-based bearing fault diagnosis method, the diagnosis method in this embodiment has high interpretability, relatively low requirements for computer hardware resources, a faster execution speed, and excellent diagnosis accuracy and model universality, is particularly suitable for multi-scenario, multi-fault bearing fault diagnosis in variable working conditions, and can be widely applied to fault diagnosis tasks in variable working conditions for complex systems such as machinery, electric power, chemical industry, and aviation. A final classifier of an existing model may be replaced with the in-domain classifier provided in this embodiment, thereby further improving the fault diagnosis performance.

The adaptive manifold probability distribution-based bearing fault diagnosis method in this embodiment effectively improves the diagnosis accuracy and the diagnosis efficiency of bearing fault diagnosis, so that use requirements can be effectively satisfied.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. An adaptive manifold probability distribution-based bearing fault diagnosis method, comprising steps of:
   1) constructing a plurality of transferable domains, wherein each transferable domain comprises data samples of a plurality of fault types of a bearing, and different transferable domains conform to different conditional distributions and marginal distributions; and defining any two transferable domains to form one transfer task, wherein in each transfer task, one transferable domain is designated as a source domain, the other transferable domain is a target domain, and each data sample in the source domain is marked with a fault type label;
   2) converting each data sample in the source domain and the target domain in each transfer task into frequency domain data via Fourier transform, inputting the frequency domain data into a Geodesic Flow Kernel (GFK) algorithm model, and calculating a manifold feature representation matrix related to a bearing fault in each transfer task by using the GFK algorithm model;
   3) calculating a cosine distance between centers of a target domain and a source domain in each transfer task according to a manifold feature representation, and defining a target function of in-domain classifier learning;
   4) solving the target function according to the solved cosine distance and a constraint that an element in a probability distribution matrix of the target domain needs to satisfy, to obtain a probability distribution matrix of the target domain; and 5) selecting a fault type label corresponding to the largest probability value corresponding to each data sample in the target domain from the probability distribution matrix as a predicted fault type label of the data sample in the target domain, to complete bearing fault diagnosis.

2. The bearing fault diagnosis method according to claim 1, wherein constructing a transferable domain comprises acquiring vibration signals of the bearing under each fault type in different working conditions as the data samples, and then grouping data samples in one same working condition into one transferable domain.

3. The bearing fault diagnosis method according to claim 1, wherein calculating a manifold feature representation matrix related to a bearing fault in each transfer task by using the GFK algorithm model in step 2) comprises steps of:

A1) defining a source domain $\mathcal{D}_s=\{X_s, Y_s\}$ and a target domain $\mathcal{D}_t=\{X_t\}$, wherein $X_s=\{x_i^s\}_{i=1}^m$ denotes a sample set of the source domain $\mathcal{D}_s$, $x_i^s$ denotes an $i^{th}$ data sample in the source domain $\mathcal{D}_s$, $Y_s=\{y_i^s\}_{i=1}^m$ denotes a fault type label set in the source domain $\mathcal{D}_s$, $y_i^s$ denotes an $i^{th}$ fault type label in the source domain $\mathcal{D}_s$, $X_t=\{x_j^t\}_{j=1}^n$ denotes a sample set of the target domain $\mathcal{D}_t$, $x_j^t$ denotes a $j^{th}$ data sample in the target domain $\mathcal{D}_t$, m denotes a total quantity of data samples in the source domain $\mathcal{D}_s$, and n denotes a total quantity of data samples in the target domain $\mathcal{D}_t$;

obtaining a subspace data set $P_S$ of the source domain $\mathcal{D}_s$ and a subspace data set $P_t$ of the target domain $\mathcal{D}_t$ by using a principal component analysis (PCA) method, combining $P_S$ and $P_t$ into one combined matrix $P_{s+t}$, and then calculating a sine angle $\alpha_d$ between $P_S$ and $P_{s+t}$ and a sine angle $\beta_d$ between $P_t$ and $P_{s+t}$, so that a consistency measurement function C(d) of $P_S$ and $P_t$ is:

$C(d)=0.5[\sin \alpha_d + \sin \beta_d];$

A2) calculating an optimal subspace dimensionality d* by using a greedy algorithm:

$d^*=\min\{d|C(d)=1\};$

A3) selecting first d* dimensions of feature vector matrices in $P_S$ and $P_t$ according to the optimal subspace dimensionality d* as preprocessed data after dimensionality reduction;

A4) calculating a manifold feature conversion core matrix G according to the preprocessed data after dimensionality reduction, and obtaining a manifold feature representation matrix W according to the manifold feature conversion core matrix G:

$W=\sqrt{G}X,$ wherein $X=[X_s, X_t]$; and

A5) obtaining a manifold feature representation matrix $W_s$ of the source domain $\mathcal{D}_s$ and a manifold feature representation matrix $W_t$ of the target domain $\mathcal{D}_t$ according to the manifold feature representation matrix W:

$$\begin{cases} W_s = \{w_i^s\}_{i=1}^m = W_{1:m} & w_i^s \in W_s, i \in \{1, 2, \ldots, m\} \\ W_t = \{w_j^t\}_{j=1}^n = W_{m+1:m+n} & w_j^t \in W_t, j \in \{1, 2, \ldots, n\} \end{cases},$$

wherein $w_i^s$ denotes an $i^{th}$ element in $W_s$, and $w_j^t$ denotes a $j^{th}$ element in $W_t$.

4. The bearing fault diagnosis method according to claim 3, wherein the target function of the in-domain classifier learning in step 3) is defined as $\mathscr{L}$, so that:

$\mathscr{L} = \Sigma_{j=1}^n \Sigma_{c=1}^C P_{cj} D_{cj},$ wherein C denotes a total quantity of fault type labels, $P_{cj}$ is an element in the probability distribution matrix $P \in \mathbb{R}^{C \times n}$ and denotes a probability that $w_j^t$ in $W_t$ is a $c^{th}$ fault type label, and $D_{cj}$ is a cosine distance between centers of the target domain $\mathcal{D}_t$ and the source domain $\mathcal{D}_s$, and also denotes a distance between $w_j^t$ and a data set center $e_c$ corresponding to the $c^{th}$ fault type label.

5. The bearing fault diagnosis method according to claim 4, wherein the cosine distance in step 3) is $D_{cj}$, and $D_{cj}$ is calculated by using the following formula:

$$D_{cj} = \frac{2^t_j e_c}{|w_j^t||e_c|},$$

wherein $e_c$ denotes the data set center corresponding to the $c^{th}$ fault type label in the source domain $\mathcal{D}_s$.

6. The bearing fault diagnosis method according to claim 5, wherein $$e_c = \frac{1}{m^{(c)}} \sum_{k=1}^m w_i^s \; I(y_i^s = c),$$

wherein $m^{(c)}$ denotes a quantity of data samples corresponding to the $c^{th}$ fault type label in the source domain $\mathcal{D}_s$, $w_i^s$ is an $i^{th}$ element in $W_s$, and denotes a manifold feature representation of the $i^{th}$ data sample in the source domain $\mathcal{D}_s$, and $I(y_i^s=c)$ is an indicator function, $$I(y_i^s = c) = \begin{cases} 1, & \text{True} \\ 0, & \text{False} \end{cases}.$$

7. The bearing fault diagnosis method according to claim 4, wherein the constraint that the element $P_{cj}$ in the probability distribution matrix P of the target domain needs to satisfy in step 4) is:

$$\text{s.t.} \begin{cases} \sum_{c=1}^C P_{cj} = 1, \forall j \in \{1, 2, \ldots, n\} \\ 0 \leq P_{cj} \leq 1 \\ \sum_{j=1}^m P_{cj} \geq 1, \forall c \in \{1, 2, \ldots, C\} \end{cases}.$$

8. The bearing fault diagnosis method according to claim 7, wherein the target function is solved in the step 4) by using a linear programming solving method.

9. The bearing fault diagnosis method according to claim 7, wherein a calculation formula for selecting a fault type label corresponding to the largest probability value corresponding to each data sample in the target domain from the probability distribution matrix as a predicted fault type label of the data sample in the target domain in step 5) is:

$$\hat{y}_j^t(x) = \arg\max_l \frac{P_{cj}}{\sum_{c=1}^C P_{cj}}, l \in \{1, 2, \ldots, C\},$$

wherein $\hat{y}_j^t(x)$ denotes a predicted fault type label of the $j^{th}$ data sample in the target domain $\mathcal{D}_t$.

\* \* \* \* \*